March 7, 1967 A. B. SIMPKINS ET AL 3,308,424
VIBRATION DETECTION
Filed Dec. 16, 1963 2 Sheets-Sheet 1
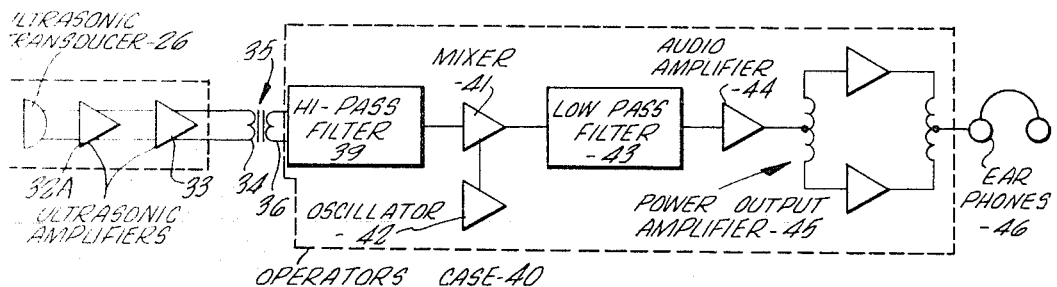
FIG. 3
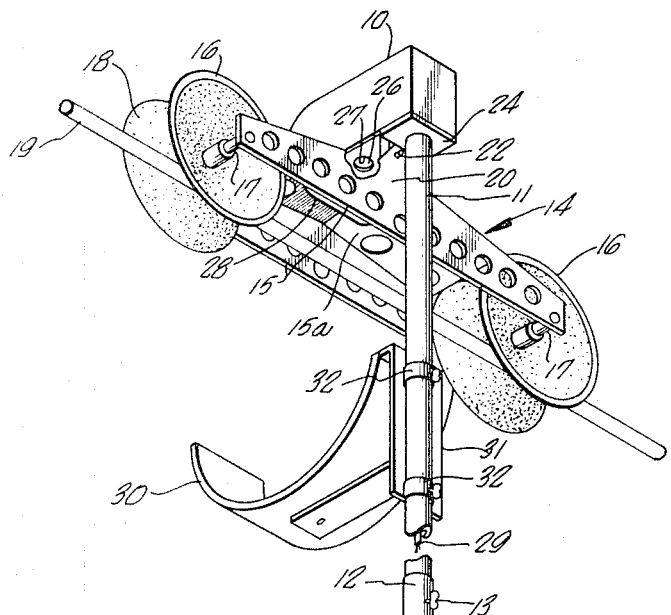
FIG. 1
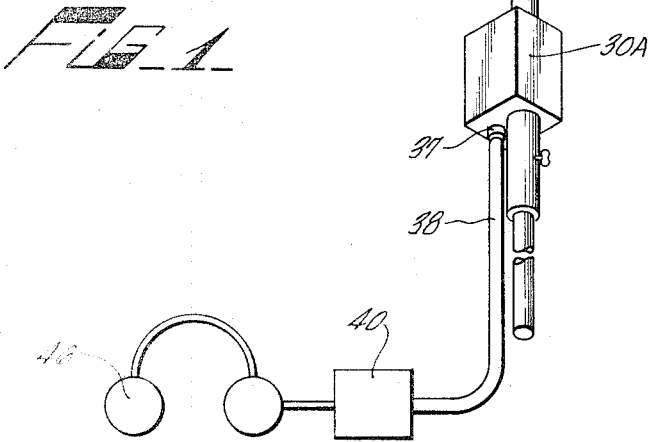
INVENTORS.
ALAN B. SIMPKINS
ROBERT H. HAMILTON
BY
Christie, Parker & Hale
ATTORNEYS.

INVENTORS.
ALAN B. SIMPKINS,
ROBERT H. HAMILTON
BY Christie, Parker & Hale
ATTORNEYS.

United States Patent Office 3,308,424
Patented Mar. 7, 1967

3,308,424
VIBRATION DETECTION
Alan B. Simpkins, Los Altos, and Robert H. Hamilton, Menlo Park, Calif., assignors, by mesne assignments, to Hewlett-Packard Company, Palo Alto, Calif., a corporation of California
Filed Dec. 16, 1963, Ser. No. 330,820
7 Claims. (Cl. 340—16)

This invention is useful for locating the source of ultrasonic vibrations from a system which generates them, and is a continuation-in-part of our copending application Serial No. 236,956 filed November 13, 1962, now U.S. Patent 3,222,635 issued December 7, 1965 and titled "Ultrasonic Vibration Detector."

The average human ear can convert vibrations in the range of about 16 to about 18,000 cycles per second into sound. The range above about 18,000 c.p.s. is known as the ultrasonic region, and the human ear is insensitive to it.

An important use of the invention is the detection and location of leaks in pressure and vacuum systems. Such leaks often generate ultrasonic vibrations, but are otherwise inconspicuous without special testing equipment. The leaks can result in expensive losses, and sometimes create hazardous or toxic conditions. Therefore, it is important that they be located and repaired as quickly as possible.

In the past, pressure leaks have been detected by various means, including the use of a soap solution which is applied over an entire pressure system in the hope that the leaking area will be covered and disclosed by the formation of bubbles. The soap solution technique has been applied to pressurized telephone conduits which are often located 20 to 40 feet above street level. It requires expensive and even hazardous equipment for an operator to apply the soap solution in looking for the leaks, and the procedure is slow. This invention overcomes these difficulties.

Vacuum leaks are even more difficult to detect than pressure leaks, and have been tested with various means, including candle flames. Other systems for detection of vacuum leaks have required introduction into the system of foreign gases which are subsequently detected by various forms of gas detectors, including mass spectrometers. This invention eliminates the need of a special detector gas and expensive equipment, such as a mass spectrometer.

In short, this invention provides for the sensitive and efficient detection of both pressure and vacuum leaks without the mess of soap bubbles or the introduction of foreign gases, which sometimes require the shut-down of the equipment under test.

In addition to the detection of leaks, the invention also is a powerful tool in the analysis of mechanical action. For example, many mechanical failures are preceded by dry bearings which give off ultrasonic noise before the failure is visually, thermally, or audibly apparent. However, the failure can often be detected before serious or expensive damage occurs by sensing the characteristic vibrations in the ultrasonic range in accordance with this invention.

This invention provides apparatus which can reach areas of difficult accessibility, and monitor extensive regions quickly for ultrasonic vibrations in an efficient and safe manner for operating personnel.

Briefly, the apparatus includes an ultrasonic transducer for receiving ultrasonic vibrations and converting them into an electric signal. Preferably, circuit means are provided for converting the signal into audible sound so the ultrasonic vibration can be "heard" by an operator.

In one embodiment of this invention used to look for leaks in a pressurized cable conduit supported from utility poles, the transducer is supported above the conduit on a frame which has wheels that roll along the conduit. A curved reflector is attached to the frame and is disposed below the conduit to present a concave surface toward the transducer. In this way, as the apparatus is moved along the conduit, any leaks which are located in the upper portion of the conduit reach the transducer directly, and those leaks in the lower portion of the conduit are reflected to the transducer. Thus, leaks are detected around the entire circumference of the conduit while using only one transducer. In another form, the reflector is omitted, and a pair of transducers are mounted on the frame to be spaced on opposite sides of the conduit under test.

When the apparatus is used for checking telephone cables, power lines, and the like, suspended from utility poles, the frame, wheels, transducer or transducers, and reflector, if used, are preferably mounted on the upper end of an elongated hollow pole made of light weight insulating material, such as fiberglass. The necessary electrical leads extend from the transducer down through the hollow pole and are attached to earphones worn by an operator. In this way, extraneous audible noise is reduced to a minimum, and the operator can concentrate on listening for audible noise converted into sound as a result of detecting ultrasonic vibrations.

Preferably, the ultrasonic vibrations are detected by converting them into an alternating electrical signal above the audio range. A second alternating electrical signal of a frequency which differs from the first by an amount in the audio range, is mixed with the first signal to produce a side band which is in the audio range, preferably a frequency of about 5,000 c.p.s. An isolation transformer is used in the transmission lines of the circuit to isolate the operator on the ground from the high voltages sometimes encountered in the vicinity of the ultrasonic transducer.

These and other aspects of the invention will be more fully understood from the following detailed description and the accompanying drawing, in which:

FIG. 1 is a perspective view of the presently preferred embodiment of the apparatus;

FIG. 3 is a schematic diagram of one type of circuit of converting ultrasonic vibrations into audible sound.

Figure 2:
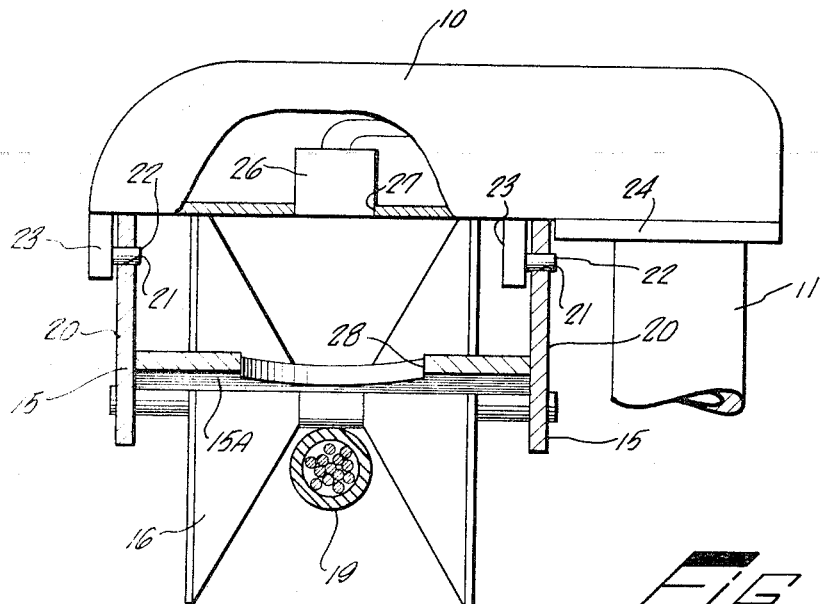
FIG. 2 is a fragmentary elevation, partly broken away, showing how the frame is attached to the pole.

Referring to FIG. 1, a housing 10 is secured to the upper end of a long vertical hollow pole 11 made of a suitable insulating material, such as fiberglass. The pole includes a plurality of telescoping joints 12 so it may be extended and locked by wing nuts 13 at various lengths.

A frame 14 includes a pair of elongated, laterally spaced upright perforated side plates 15 which are disposed side by side and secured at their upper edges to a perforated cross plate 15A. A separate rotatable wheel 16 is mounted on a respective axle 17 secured across adjacent ends of the cross plate. Each wheel has a V-shaped groove 18 around its periphery to fit over a conduit 19, or the like, which is under inspection. Each wheel is preferably made of wood, plastic, e.g., nylon, or other non-metallic material to reduce noise as it rolls. Alternatively, the wheel can be made of metal and coated with a sound-deadening material, such as rubber.

As shown best in FIG. 2, each side plate 15 has an upwardly extending ear 20 with a respective transverse bore 21 that fits over a respective horizontal retaining pin 22 mounted on a respective bracket 23 on the underside of the housing. A stop plate 24 is secured to the underside of the housing adjacent the pole and terminates near one of the brackets 23. The ears are sufficiently flexible to permit them to be squeezed together while they are worked into the position shown in FIG. 2. When they are relased, they spring apart and stay retained in the position shown in FIG. 2 by the stop plate.

The conduit 19 under a test can be any of a number of different types of installations, but for the purpose of explanation, it is assumed to be a gas-pressurized conduit for telephone cables supported above street level by utility poles (not shown).

An ultrasonic transducer 26 is mounted in the housing over an opening 27 in the bottom of the housing and "looks" through an opening 28 in the cross plate at the conduit 19. Thus, the transducer is mounted with its sensitive end down, which minimizes extraneous effects such as rain or falling particles which may be jarred loose as the unit is rolled on the system under inspection, and which might fall onto the sensitive end of the transducer if it were up.

An upwardly opening U-shaped reflector 30 is mounted on a bracket 31 secured by adjustable clamps 32 to the pole under the frame. Thus, the intermediate part of the reflector is concave upwardly toward the conduit and reflects vibrations from the bottom side of the conduit back up to the transducer.

The ultrasonic transducer can be of any conventional type, but preferably it is fairly selective to ultrasonic vibrations and rejects substantially all vibrations below about 20,000 c.p.s. The transducer is connected in an electric circuit as shown in FIG. 3, through an electrical cable 29 extending from the transducer probe down through the hollow pole to a transformer case 30A secured to the pole.

Referring to FIG. 3, the transducer 26 has its outlet coupled to a first ultrasonic amplifier 32A connected in cascade arrangement with a second ultrasonic amplifier 33. These two amplifiers are mounted as pre-amps in the housing. The output from the second amplifier is connected through the cable 29 to a primary winding 34 of an isolation transformer 35. A secondary winding 36 is connected by a plug 37 and a cord 38 to a high-pass filter 39 in an operator's case 40 at the lower end of the pole. The high-pass filter is designed to reject substantially all of the signal in the frequency range below about 15,000 c.p.s. The high frequency portion of the signal going through the high-pass filter is fed into a mixer 41 which also receives the output of an ultrasonic beat frequency oscillator 42. Preferably, the ultrasonic oscillator has a frequency which differs from the incoming frequency from the high-pass filter by about 3,000 to about 5,000 c.p.s. The resulting family of frequencies from the mixer is subjected to a low-pass filter 43 which removes all frequencies with the exception of those below about 5,000 c.p.s. In other words, only the lower side band of the mixed signals goes through the low-pass filter.

The low frequency signal from the low-pass filter passes through an audio amplifier 44, and then through a power output amplifier stage 45, which drives a pair of earphones 46. The circuit is supplied the necessary power by conventional means, which are not shown for the sake of simplicity.

In using the apparatus shown in FIGS. 1–3, the pole is extended to the desired length and locked in that position. The operator turns on the circuit and places the earphones over his ears. The wheels are placed as shown in FIG. 1 to ride on the pressurized conduit, and the apparatus is rolled along the conduit by pulling the pole. The reflector is positioned on the pole by the adjustable brackets to be spaced far enough away from the conduit to clear any obstructions, such as insulators, splices, and the like. If there are conduits below the one under test, the reflector is set above them, but still below the conduit being tested. If a leak is encountered which generates ultrasonic vibrations, the vibrations either are picked up directly by the transducer, or else are reflected from the concave surface of the reflector to the transducer, from which they are converted by the circuit to audible noise at the earphones. The reflector also shields the sensitive end of the transducer from extraneous ultrasonic noises below the system under inspection, e.g. from ultrasonic noises generated by the operator walking through weeds. The circuit converts the ultrasonic vibrations into audible sound, and the operator is told instantly and safely the location of the leak, so that it can be repaired.

The pivotal mounting of the pole on the frame makes the unit easier to handle as the pole is pulled along. It also makes it easy to reverse the direction of pull to double back over a suspected leak area.

Thus, the operator is safely insulated from power lines by the insulating pole and the isolation transformer, and he does not have to use a ladder or the like to climb up to the conduit to apply soap solution.

Figure 4:
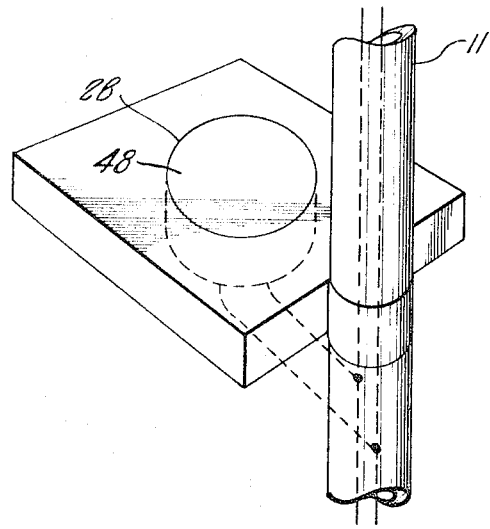
FIG. 4 is a perspective view of an alternate embodiment using two ultrasonic transducers instead of a reflector.

In the alternate embodiment shown in FIG. 4, the reflector is replaced by a second or lower ultrasonic transducer 48 secured to the pole below the frame. The second transducer is aimed toward the bottom side of the conduit, and is connected through its own pre-amp stage (not shown) to the primary winding of the isolation transformer to be in parallel with the first or upper transducer 26. Thus, both the bottom and top of the conduit are monitored directly for leaks without the use of the reflector.

We claim:

1. Apparatus for locating the source of ultrasonic vibrations from a member which generates them, the apparatus comprising a pole adapted to be supported by the member, and a pair of spaced-apart ultrasonic transducers mounted on the pole for receiving the vibrations and converting them into an electric signal, the transducers being positioned to face each other whereby they receive vibrations directly from opposite sides of the member when the member is disposed between the transducers.

2. Apparatus for locating the source of ultrasonic vibrations from an elongated member which generates them, the apparatus comprising a pole, a rotatable wheel mounted on the pole and shaped to roll along the elongated member, and a pair of spaced-apart ultrasonic transducers mounted on the pole and positioned to face each other for receiving the vibrations from opposite sides of the member and converting them into an electric signal.

3. Apparatus for locating the source of ultrasonic vibrations from an elongated member which generates them, the apparatus comprising an elongated upright pole, a frame mounted on the pole to pivot about a horizontal axis, a pair of rotatable wheels mounted on the frame and shaped to roll along the elongated member, the wheels being rotatable about an axis extending in the same general direction as that about which the frame pivots, and a pair of spaced-apart ultrasonic transducers mounted on the frame for receiving the vibrations from opposite sides of the member and converting them into an electric signal.

4. Apparatus for locating the source of ultrasonic vibrations from an elongated member which generates them, the apparatus comprising a pole, a frame mounted on the pole, a pair of rotatable wheels mounted on the frame and shaped to roll along the elongated member, and a pair of spaced-apart ultrasonic transducers mounted from the pole for receiving the vibrations from opposite sides of the member and converting them into an electric signal.

5. Apparatus for locating the source of vibrations from an elongated member from which the vibrations emanate, the apparatus comprising a frame, a pair of rotatable wheels mounted on the frame and adapted to roll along the elongated member, a transducer mounted on the frame for receiving vibrations from the member and converting them into an electric signal, an isolation transformer having an input and an output, means connecting the transducer to the transformer input, and a circuit connected to sense the output of the transformer.

6. Apparatus for locating the source of vibrations from an elongated member from which the vibrations emanate, the apparatus comprising a pole, a frame connected to the pole, a pair of rotatable wheels mounted on the frame and adapted to roll along the elongated member, a transducer mounted on the frame for receiving vibrations from the member and converting them into an electrical signal, an isolation transformer mounted on the pole and having an input and an output, means connecting the transducer to the transformer input, and a circuit connected to sense the output of the transformer.

7. Apparatus for locating the source of vibrations from an elongated member from which the vibrations emanate, the apparatus comprising a frame, a pair of rotatable wheels mounted on the frame and adapted to roll along the elongated member, a transducer mounted on the frame for receiving vibrations from the member and converting them into an electric signal, a reflector spaced from the transducer and arranged to reflect vibrations from the member to the transducer, an isolation transformer having an input and an output, means connecting the transducer to the transformer input, and a circuit connected to sense the output of the transformer.

References Cited by the Examiner

UNITED STATES PATENTS

| | | | |
|---|---|---|---|
| 2,518,518 | 8/1950 | Beldi | 340—6 X |
| 2,715,192 | 8/1955 | Kelly | 310—26 |
| 3,028,450 | 4/1962 | Manning | 179—1 |
| 3,036,457 | 5/1962 | Wood et al. | 73—40.5 |
| 3,170,152 | 2/1965 | Long | 340—242 |

FOREIGN PATENTS 669,125  12/1938  Germany.

OTHER REFERENCES

"Corona Hunter," Popular Electronics, vol. 16, No. 4, April 1962 (page 6 relied on).

CHESTER L. JUSTUS, *Primary Examiner.*

R. A. FARLEY, *Assistant Examiner.*